(12) United States Patent
Wolcott et al.

(10) Patent No.: US 9,015,786 B2
(45) Date of Patent: Apr. 21, 2015

(54) NOISE INGRESS DETECTION

(71) Applicant: Comcast Cable Communications, LLC, Philadelphia, PA (US)

(72) Inventors: Lawrence Wolcott, Denver, CO (US); Phillip Chang, Langhorne, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 92 days.

(21) Appl. No.: 13/692,499

(22) Filed: Dec. 3, 2012

(65) Prior Publication Data

US 2014/0153624 A1 Jun. 5, 2014

(51) Int. Cl.
*H04N 7/173* (2011.01)
*H04B 15/00* (2006.01)
*H04L 12/28* (2006.01)

(52) U.S. Cl.
CPC ............ *H04B 15/00* (2013.01); *H04L 12/2801* (2013.01)

(58) Field of Classification Search
USPC ........................................................ 725/125
See application file for complete search history.

(56) References Cited

U.S. PATENT DOCUMENTS

| | | | |
|---|---|---|---|
| 5,311,546 A | 5/1994 | Paik et al. | |
| 5,881,108 A | 3/1999 | Herzberg et al. | |
| 6,556,239 B1 | 4/2003 | Al-Araji et al. | |
| 6,671,334 B1 | 12/2003 | Kuntz et al. | |
| 6,728,887 B1* | 4/2004 | Dziekan et al. | 726/3 |
| 6,862,315 B1 | 3/2005 | Garg et al. | |
| 6,880,170 B1* | 4/2005 | Kauffman et al. | 725/125 |
| 6,947,502 B2 | 9/2005 | Taylor et al. | |
| 7,142,609 B2 | 11/2006 | Terreault et al. | |
| 7,742,777 B2* | 6/2010 | Strater et al. | 455/501 |
| 8,143,900 B2* | 3/2012 | Shimp et al. | 324/527 |
| 8,284,828 B2 | 10/2012 | Cooper et al. | |
| 8,458,759 B2* | 6/2013 | Zinevich | 725/125 |
| 8,576,705 B2 | 11/2013 | Thibeault et al. | |
| 8,650,602 B2* | 2/2014 | Pond et al. | 725/93 |
| 2001/0017904 A1 | 8/2001 | Pukkila et al. | |
| 2003/0109999 A1 | 6/2003 | Stein et al. | |
| 2004/0100881 A1 | 5/2004 | Wakabayashi et al. | |
| 2004/0153898 A1 | 8/2004 | Hidaka | |
| 2004/0222908 A1* | 11/2004 | MacDonald et al. | 341/144 |
| 2005/0207346 A1 | 9/2005 | Chu et al. | |
| 2005/0226421 A1 | 10/2005 | Briancon et al. | |
| 2006/0007997 A1 | 1/2006 | Jones | |
| 2006/0121946 A1 | 6/2006 | Walton et al. | |
| 2006/0271986 A1* | 11/2006 | Vogel | 725/111 |
| 2007/0109995 A1 | 5/2007 | Quigley et al. | |

(Continued)

FOREIGN PATENT DOCUMENTS

JP 04208707 A 7/1992

OTHER PUBLICATIONS

DOCSIS® Best Practices and Guidelines Proactive Network Maintenance Using Preequalization CM-GL-PNMP-V01-100415; Apr. 15, 2010.

(Continued)

*Primary Examiner* — Mulugeta Mengesha
(74) *Attorney, Agent, or Firm* — Banner & Witcoff, Ltd.

(57) ABSTRACT

Methods and systems are provided for detection of noise ingress into a network. In an aspect, multiple access devices on the network are analyzed for noise ingress. In another aspect, using characterization data of components in the network and the detection of the noise at the access devices, the location of the noise ingress can be determined.

19 Claims, 14 Drawing Sheets

(56) References Cited

U.S. PATENT DOCUMENTS

| | | | |
|---|---|---|---|
| 2007/0288982 A1* | 12/2007 | Donahue | 725/125 |
| 2008/0080607 A1 | 4/2008 | Shah | |
| 2008/0089224 A1 | 4/2008 | Kim et al. | |
| 2008/0276111 A1 | 11/2008 | Jacoby et al. | |
| 2009/0007210 A1* | 1/2009 | Nishide et al. | 725/125 |
| 2010/0095360 A1 | 4/2010 | Pavlovski et al. | |
| 2010/0158093 A1 | 6/2010 | Thompson et al. | |
| 2010/0223650 A1 | 9/2010 | Millet et al. | |
| 2011/0026577 A1 | 2/2011 | Primo et al. | |

OTHER PUBLICATIONS

Document titled "VSWR, or Voltage Standing Wave Ratio"; prior to Nov. 1, 2010.

Cablelabs invention disclosure titled "Pre-Equalization based proactive network maintenance process model"; prior to Nov. 1, 2010.

Hranac, R., "Linear Distortions part 1 ," downloaded Apr. 22, 2010.

Qureshi, S.U.H., "Adaptive Equalization," Proceedings of the IEEE, Sep. 1985.

Cablelabs invention disclosure titled "A Simple algorithm for fault localization using naming convention and micro-reflection signature"; prior to Nov. 1, 2010.

Thompson, R. et al., "Optimizing Upstream Throughput Using Equalization Coefficient Analysis"; prior to Nov. 1, 2010.

"VSWR, or Voltage Standing Wave Ratio", available at http://emc.toprudder.com/vswr.pdf (last visited Nov. 22, 2010).

Melissa Ray Weimer, "Waveform Analysis Using the Fourier Transform", DATAQ Instruments, Inc., available at http://www.dataq.com/applicat/articles/an11.htm (last visited Nov. 22, 2010).

Rob Thompson et al., "Optimizing Upstream Throughput Using Equalization Coefficient Analysis", Motorola Home & Networks Mobility.

Robert L. Howald et al., "Characterizing and Aligning the HFC Return Path for Successful DOCSIS 3.0 Rollouts", SCTE Cable-Tec Expo, Denver, CO, Oct. 28-30, 2009.

Robert L. Howald et al., "Docsis 3.0 Upstream: Readiness & Qualification".

* cited by examiner

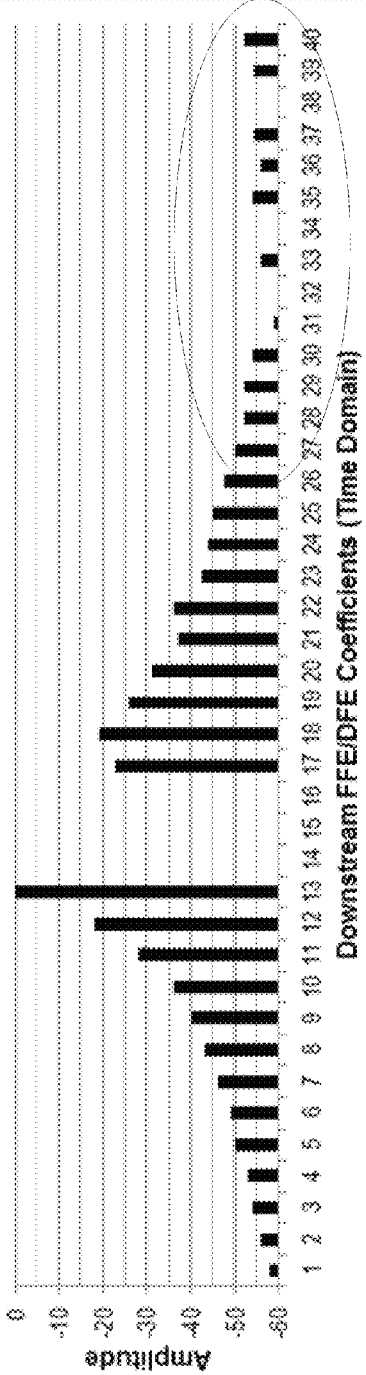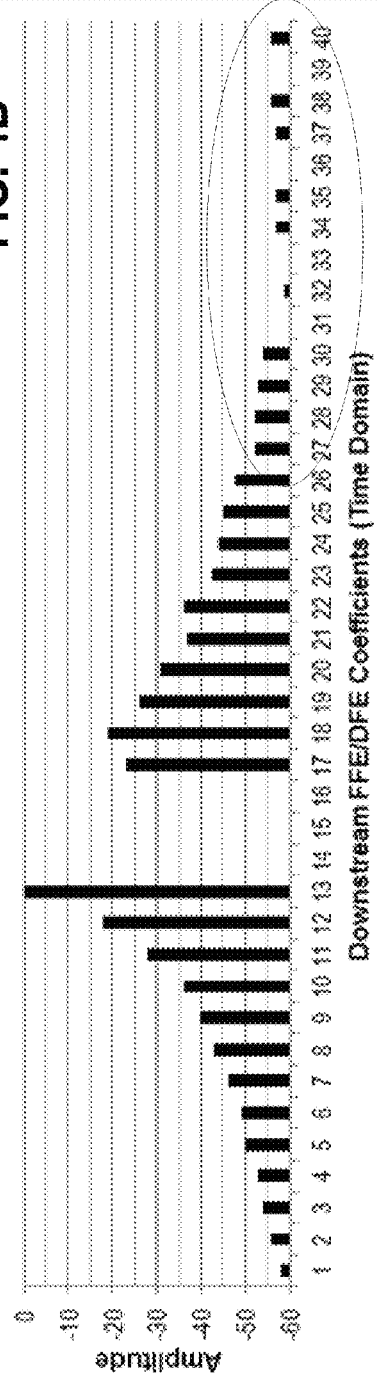

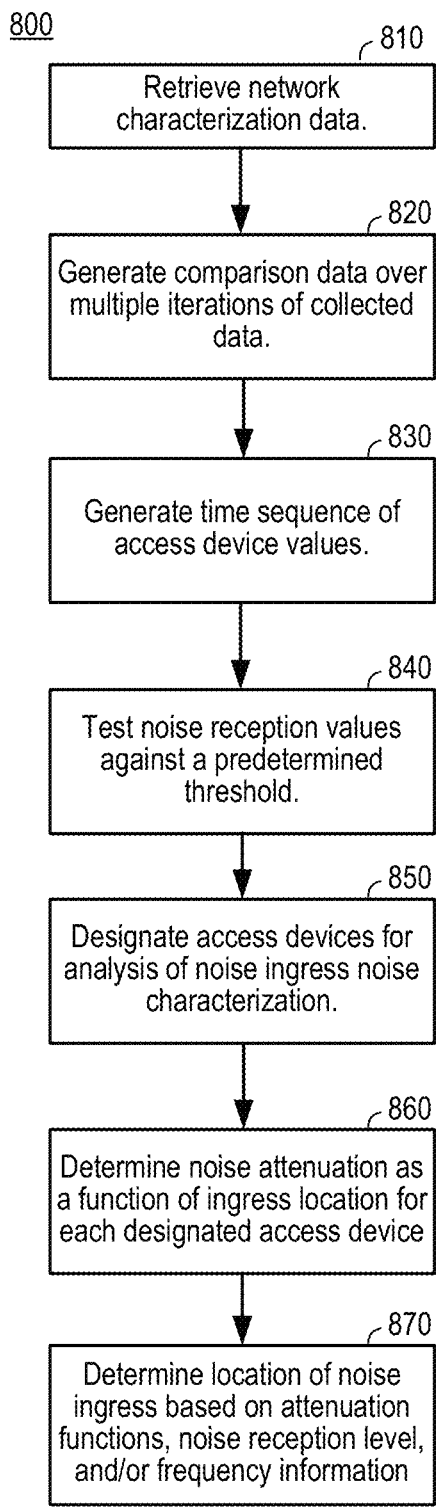
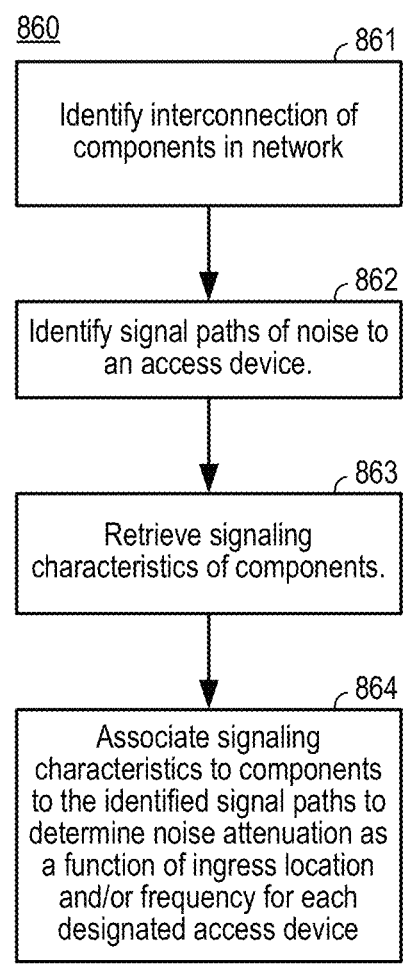
FIG. 8A
FIG. 8B

| 150↘ | | | | | | | | |
|---|---|---|---|---|---|---|---|---|
| 151 | 152 | 153-1 | | 153-2 | | | 153-P | |
| Index | AD Identifier | Tap 1 | | Tap 2 | | ... | Tap P | ... |
| | | r | i | r | i | | r | i |
| 00001 | <MAC addr. for AD1> | <r> | <i> | <r> | <i> | ... | <r> | <i> | ... |
| 00002 | <MAC addr. for AD2> | <r> | <i> | <r> | <i> | ... | <r> | <i> | ... |
| 00003 | <MAC addr. for AD3> | <r> | <i> | <r> | <i> | ... | <r> | <i> | ... |
| ⋮ | ⋮ | ⋮ | ⋮ | ⋮ | ⋮ | | ⋮ | ⋮ |
| N | <MAC addr. for ADn> | <r> | <i> | <r> | <i> | ... | <r> | <i> | ... |

FIG. 9A

| 150↘ | | | | | | | |
|---|---|---|---|---|---|---|---|
| 151 | 152 | 154-1 | 154-2 | ... | 154-P | 155 | 156 |
| Index | AD Identifier | Tap 1 | Tap 2 | ... | Tap P | ... | Sum | Freq. |
| 00001 | <MAC addr. for AD1> | <d> | <d> | ... | <d> | ... | <s> | <f> |
| 00002 | <MAC addr. for AD2> | <d> | <d> | ... | <d> | ... | <s> | <f> |
| 00003 | <MAC addr. for AD3> | <d> | <d> | ... | <d> | ... | <s> | <f> |
| ⋮ | ⋮ | ⋮ | ⋮ | | ⋮ | | ⋮ | ⋮ |
| N | <MAC addr. for ADn> | <d> | <d> | ... | <d> | ... | <s> | <f> |

FIG. 9B

| 160↘ | | | | | | | | | | | | |
|---|---|---|---|---|---|---|---|---|---|---|---|---|
| 161 | 162 | 163-1 | | | 163-2 | | | | 163-T | | |
| Index | AD Identifier | Iteration 1 | | | Iteration 2 | | | ... | Iteration T | | |
| | | t | s | f | t | s | f | | t | s | f |
| 00001 | <MAC addr. for AD1> | <t> | <s> | <f> | <t> | <s> | <f> | ... | <t> | <s> | <f> |
| 00002 | <MAC addr. for AD2> | <t> | <s> | <f> | <t> | <s> | <f> | ... | <t> | <s> | <f> |
| 00003 | <MAC addr. for AD3> | <t> | <s> | <f> | <t> | <s> | <f> | ... | <t> | <s> | <f> |
| ⋮ | ⋮ | ⋮ | ⋮ | ⋮ | ⋮ | ⋮ | ⋮ | | ⋮ | ⋮ | ⋮ |
| N | <MAC addr. for ADn> | <t> | <s> | <f> | <t> | <s> | <f> | ... | <t> | <s> | <f> |

FIG. 9C

| Index | Id. | Attenuation Factor |
|---|---|---|
| 1 | AD1 | AF1(location, frequency) |
| 2 | AD2 | AF2(location, frequency) |
| 3 | AD3 | AF3(location, frequency) |
| 4 | AD4 | AF4(location, frequency) |
| 5 | AD5 | AF5(location, frequency) |
| 6 | AD6 | AF6(location, frequency) |

FIG. 9D

| Node | Device 1 | | Device 2 | |
|---|---|---|---|---|
| | Device | Terminal | Device | Terminal |
| 1 | FN | 1 | S11 | 1 |
| 2 | S11 | 2 | A2 | 1 |
| 3 | A2 | 2 | S10 | 1 |
| 4 | S10 | 2 | T2 | 1 |
| 5 | T2 | 2 | A6 | 1 |
| 6 | T2 | 3 | S9 | 1 |
| 7 | S9 | 2 | T3 | 1 |
| 8 | T3 | 2 | AD5 | 1 |
| 9 | T3 | 3 | S8 | 1 |
| 10 | S8 | 2 | A3 | 1 |
| 11 | A3 | 2 | S7 | 1 |
| 12 | S7 | 2 | T4 | 1 |
| 13 | T4 | 3 | S6 | 1 |
| 14 | S6 | 2 | T5 | 1 |
| 15 | T5 | 2 | AD4 | 1 |
| 16 | T5 | 3 | S5 | 1 |
| 17 | S5 | 2 | T6 | 1 |
| 18 | T6 | 2 | AD3 | 1 |
| 19 | T6 | 3 | S4 | 1 |
| 20 | S4 | 2 | T7 | 1 |
| 21 | T7 | 2 | S3 | 1 |
| 22 | T7 | 3 | S2 | 1 |
| 23 | T7 | 4 | Term | 1 |
| 24 | S3 | 2 | AD2 | 1 |
| 25 | S2 | 2 | T8 | 1 |
| 26 | T8 | 2 | Term | 1 |
| 27 | T8 | 3 | S1 | 1 |
| 28 | S1 | 2 | AD1 | 1 |

FIG. 9E

| Index | Id. | Parameter 1 | | Parameter 2 | | Parameter 3 | | Parameter 4 | |
|---|---|---|---|---|---|---|---|---|---|
| | | Para. | Value | Para. | Value | Para. | Value | Para. | Value |
| 1 | AD1 | Type | AD | sig. loss | 0dB | | | | |
| 2 | AD2 | Type | AD | sig. loss | 0dB | | | | |
| 3 | AD3 | Type | AD | sig. loss | 0dB | | | | |
| 4 | AD4 | Type | AD | sig. loss | .5dB | | | | |
| 5 | AD5 | Type | AD | sig. loss | .5dB | | | | |
| 6 | AD6 | Type | AD | sig. loss | .5dB | | | | |
| 7 | S1 | Type | RG-6 | 5-42MHz | 1dB/100ft | .6-.75 GHz | 5dB/100ft | length | 10ft |
| 8 | S2 | Type | RG-6 | 5-42MHz | 1dB/100ft | .6-.75 GHz | 5dB/100ft | length | 200ft |
| 9 | S3 | Type | RG-6 | 5-42MHz | 1dB/100ft | .6-.75 GHz | 5dB/100ft | length | 100ft |
| 10 | S4 | Type | RG-11 | 5-42MHz | .5dB/100ft | .6-.75 GHz | 2dB/100ft | length | 100ft |
| 11 | S5 | Type | RG-11 | 5-42MHz | .5dB/100ft | .6-.75 GHz | 2dB/100ft | length | 100ft |
| 12 | S6 | Type | RG-11 | 5-42MHz | .5dB/100ft | .6-.75 GHz | 2dB/100ft | length | 100ft |
| 13 | S7 | Type | RG-11 | 5-42MHz | .5dB/100ft | .6-.75 GHz | 2dB/100ft | length | 100ft |
| 14 | S8 | Type | RG-11 | 5-42MHz | .5dB/100ft | .6-.75 GHz | 2dB/100ft | length | 100ft |
| 15 | S9 | Type | RG-11 | 5-42MHz | .5dB/100ft | .6-.75 GHz | 2dB/100ft | length | 100ft |
| 16 | S10 | Type | RG-11 | 5-42MHz | .5dB/100ft | .6-.75 GHz | 2dB/100ft | length | 100ft |
| 17 | S11 | Type | RG-11 | 5-42MHz | .5dB/100ft | .6-.75 GHz | 2dB/100ft | length | 400ft |
| 18 | S12 | Type | RG-11 | 5-42MHz | .5dB/100ft | .6-.75 GHz | 2dB/100ft | length | 500ft |
| 19 | A2 | Type | Amp | 5-42MHz | 10dB(up), -60dB(dn) | .6-.75 GHz | -60dB(up), 10dB(dn) | | |
| 20 | A3 | Type | Amp | 5-42MHz | 10dB(up), -60dB(dn) | .6-.75 GHz | -60dB(up), 10dB(dn) | | |
| 21 | T2 | Type | tap | ins. loss | 1dB | tap iso. | 20dB | | |
| 22 | T3 | Type | tap | ins. loss | 1dB | tap iso. | 20dB | | |
| 23 | T4 | Type | tap | ins. loss | 1dB | tap iso. | 20dB | | |
| 24 | T5 | Type | tap | ins. loss | 1dB | tap iso. | 20dB | | |
| 25 | T6 | Type | tap | ins. loss | 1dB | tap iso. | 20dB | | |
| 26 | T7 | Type | splitter | ins. loss | 4dB | tap iso. | 20dB | | |
| 27 | T8 | Type | splitter | ins. loss | 4dB | tap iso. | 20dB | | |

FIG. 9F

NOISE INGRESS DETECTION

BACKGROUND

Many communication networks include multiple access devices communicating with a hub device. Anomalies in a communication channel between an access device and the hub may induce signal distortions in the channel, thereby causing issues such as inter-symbol interference (ISI). Examples of such anomalies may include micro-reflections due to impedance discontinuities and the ingress of noise from external sources.

To compensate for anomalies, devices (e.g., transmitters and receivers) on the network may incorporate equalizers. For anomalies that are known and are static (e.g., do not change over time), equalizers with fixed parameters may be designed and utilized. For example, fixed equalizers may be inserted at amplifiers along a signal path to correct for amplitude tilt due to frequency dependent attenuation along the signal path (e.g., along a coaxial cable). Fixed equalizers, however, may be insufficient for mitigating dynamic anomalies that change over time, such as the ingress of noise through an unshielded signal path. Such anomalies may be induced, for example, by the momentary operation of a motor or transformer next to the signal path, or by an external transmitter outside of the communication system (e.g., cellular phone, wireless transmitter, etc.). To compensate for changing anomalies, adaptive equalizers may be used. Adaptive equalizers, as their name suggests adapt their characteristics according to changing distortions in the communication channel. Various algorithms may be used to determine the equalizers coefficients based on measured distortions in order to optimize signal transmission. The distortions are measured and the equalizer coefficients are calculated and updated in a sufficiently short amount of time in order to account for the changing environment.

While adaptive equalizers may improve signal transmission, not all distortions can be compensated for by using an adaptive equalizer. Thus, a need exists to be able to locate and correct the cause of dynamic distortions. However, finding the location of such distortions is problematic. For example, the source of the noise may not be generated by a device in the communication network (e.g., access device, splitter, etc.), and because the noise source may not always be present.

SUMMARY

This Summary is provided to introduce a selection of concepts in a simplified form that are further described below in the Detailed Description. This Summary is not intended to identify key features or essential features of the disclosure.

In one aspect, a system is provided, which includes an access network having a number of different communication paths. In at least some embodiments, a computing device such as an analyzer can obtain data regarding signal characteristics in each of multiple communication channels within the access network. Each channel may be associated with an individual access device and can represent a physical path from that individual access device to a termination system or other type of hub. The data acquired by the analyzer may include adaptive equalizer data (e.g., coefficients) from each of a selected number of access devices connected to the communication channel. The access network may include multiple different communication segments (e.g., optical, coaxial, twisted pair, etc.) separated by amplifiers, signal combiners/splitters, and other hardware. Each channel may traverse a number of the segments. Different channels may share some segments, and may have other segments that are unique to just one channel.

In various examples, the analyzer or other computing device may determine a location of noise ingress along one or more paths in the access network based on the signal characteristic data. Various examples include the analyzer obtaining multiple samples of adaptive equalizer data from one or more access devices, and detecting changes in the adaptive equalizer data over time in order to determine the location of the noise ingress. In further examples, the analyzer or other computing device may identify the source generating the noise based on the signal characteristic data. Other embodiments are discussed below.

BRIEF DESCRIPTION OF THE DRAWINGS

FIG. 4A-4B include illustrative graphs of equalizer coefficients in accordance with various embodiments.

FIGS. 8A-8B illustrate operations in a flow chart that may be performed in accordance with one or more embodiments.

FIGS. 9A-9F illustrate various data structures in accordance with one or more embodiments.

DETAILED DESCRIPTION

Figure 1:
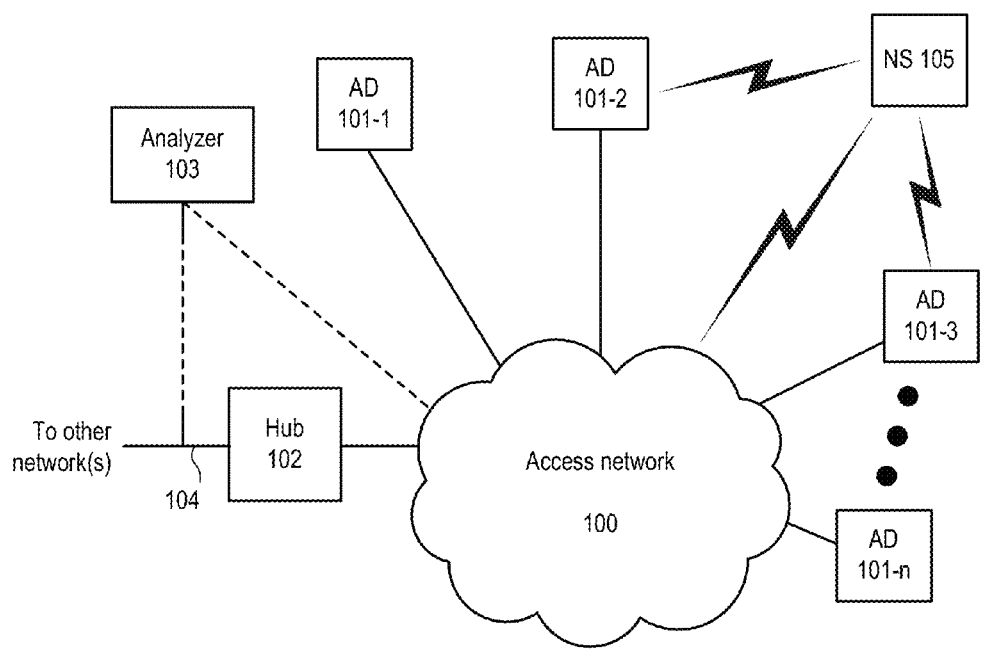
FIG. 1 is a block diagram showing elements in an illustrative access network in which some embodiments may be practiced.

FIG. 1 is a block diagram illustrating elements in an exemplary access network 100 according to some embodiments. Each of multiple access devices (AD) 101-1 through 101-n communicates with a hub 102 across a particular path through access network 100. Each of devices 101-1 through 101-n may share a portion of its particular communication path to hub 102 with one or more other access devices 101-1 through 101-n (e.g., access devices on the same street, on the same building floor, or otherwise similar geospatial region).

In some embodiments, hub 102 may include a termination system (e.g., CMTS) or other type of similar system, network 100 may be an access network (e.g., optical, hybrid-fiber coaxial (HFC), twisted pair, etc.), and access devices 101-1 through 101-n may be modems or other devices (e.g., cable modems, set top terminals, etc.) communicating via the access network.

While some embodiments are described in the context of communications between modems and a termination system in an access network, other embodiments may include different types of access devices (e.g., fiber optic modems, wireless transceivers, gateways, set top terminals, digital video recorders) and/or different types of hubs (e.g., optical line terminals, wireless base stations, satellites). Such networks may use any of numerous communication protocols and various different types of physical communication media (e.g., twisted pair conductors, wireless RF communications, fiber optical link, etc.).

In some embodiments, for example, network 100 may be a digital subscriber line (DSL) network, hub 102 may be a DSL access module (DSLAM), and access devices 101-1 through 101-*n* may be DSL modems or other devices communicating via the DSL network. In still other embodiments, network 100 may be a satellite, cellular, or other wireless network employing adaptive equalization, access devices 101-1 through 101-*n* may be transceivers through which users can access the wireless network, and hub 102 may be a base station or other wireless network hub. In yet other embodiments network 100 may be a Fiber to the Home (FTTH), Fiber to the Premises (FTTP) passive optical network (PON), RF over glass (RFOG), Digital Subscriber Line (DSL), multimedia over coax access (MOCA), etc.

Hub 102 may communicate over one or more links 104 (e.g., a Gigabit Ethernet link) with the Internet, a private IP (internet protocol) data network, and/or other network that allows communications between devices 101-1 through 101-*n* (via hub 102) and one or more external networks. In the examples of FIG. 1 and subsequent figures, "n" represents an arbitrary number. Network 100 may include tens, hundreds, thousands or more access devices. Hub 102 may also utilize links 104 for communication with billing servers, network management servers, and/or other network elements. One such network element is analyzer 103. Analyzer 103 may retrieve from hub 102 data that indicates the signal characteristics in communication paths between devices 101-1 through 101-*n* and hub 102. In some embodiments, this data includes pre-equalizer and post-equalizer tap coefficients from devices 101-1 through 101-*n*. According to some embodiments, Analyzer 103 may process the retrieved data to characterize devices 101-1 through 101-*n*, to identify devices that share communication paths or portions of paths, to diagnose and locate network problems such as noise/interference ingress, to identify unauthorized and/or unprovisioned devices, and/or perform other operations described herein. Although FIG. 1 shows analyzer 103 communicating with hub 102 over link 104, analyzer 103 could alternatively be connected to (or be a part of) hub 102, or may alternatively be connected to access network 100 itself.

At various times, a noise source (NS) 105 may be present that introduces noise into the system at one or more access devices (e.g., AD 101-2, AD 101-3) and/or at a location within access network 100.

Figure 2:
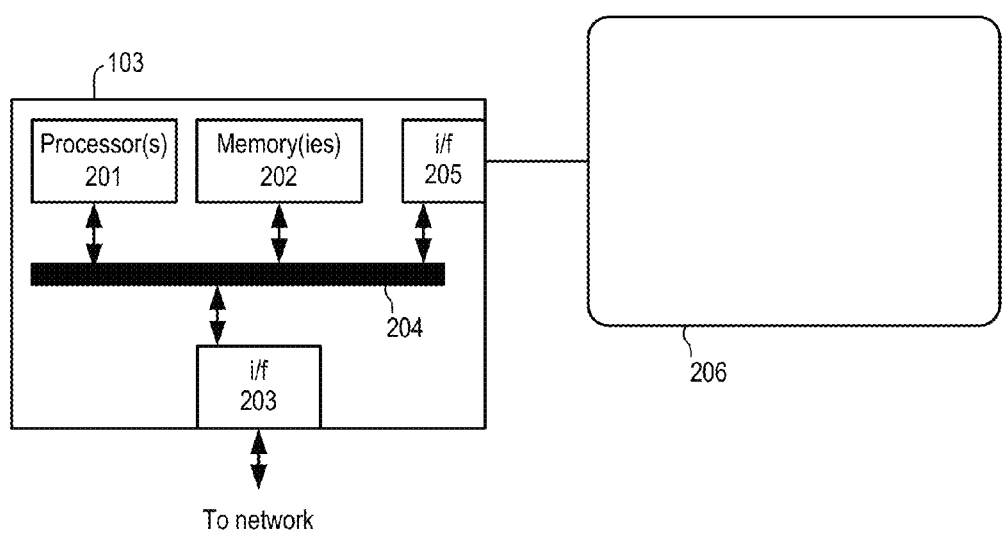
FIG. 2 is a block diagram showing elements of an illustrative computer analyzing device in which some embodiments may be practiced.

FIG. 2 is a block diagram of an illustrative analyzer 103 according to some embodiments. In at least some embodiments, analyzer 103 can be implemented as (or as part of) a server or other general purpose computer platform. Such a computer could be dedicated to performing analyzer 103 operations described herein, or could additionally perform other operations. Analyzer 103 may communicate with hub 102 and/or other network elements over one or more network interfaces (i/f) 203. Interface 203 could be, e.g., a Gigabit Ethernet card, 802.11 wireless interface, etc. Analyzer 103 may further include memory 202 for storing instructions and data and a processor 201 for executing instructions and controlling operations of analyzer 103 to perform the various functions described herein. Although a single block is shown for memory 202 and a single block is shown for processor 201, data/instruction storage and computational operations of analyzer 103 could respectively be distributed across multiple memory devices and multiple processors located within analyzer 103 or spread across multiple platforms (e.g., multiple general-purpose computers, servers, mainframes, etc.).

Memory 202 may include volatile and non-volatile memory and can include any of various types of storage technology, including but not limited to read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory, or other devices with equivalent capabilities. Processor 201 may be implemented with any of numerous types of devices, including but not limited to microprocessors, digital signal processors, embedded processors, application specific integrated circuits, field programmable gate arrays, and combinations thereof. In at least some embodiments, processor 201 carries out operations of analyzer 103 described herein according to machine-readable instructions stored in memory 202 and/or stored as hardwired logic gates within processor 201. Processor 201 communicates with and controls memory 202 and interface 203 over one or more buses 204.

Analyzer 103 can output data to a user on a display 206 using video interface 205. Although not shown, analyzer 103 may also receive user input via a keyboard, mouse, or other input device. In some embodiments, analyzer 103 may communicate with other computers and devices over network interface 203. For example, a user having a computer (e.g., a laptop computer, PDA, smartphone, etc.) could establish a communication session with analyzer 103 over one or more network links. The user could provide instructions, submit queries, or otherwise interact with analyzer 103 by sending communications over the network links. Analyzer 103 could then provide data outputs to the user's computer over those same or other links, which data could then be output on a display of the user's computer (e.g., a web server).

Figure 3A:
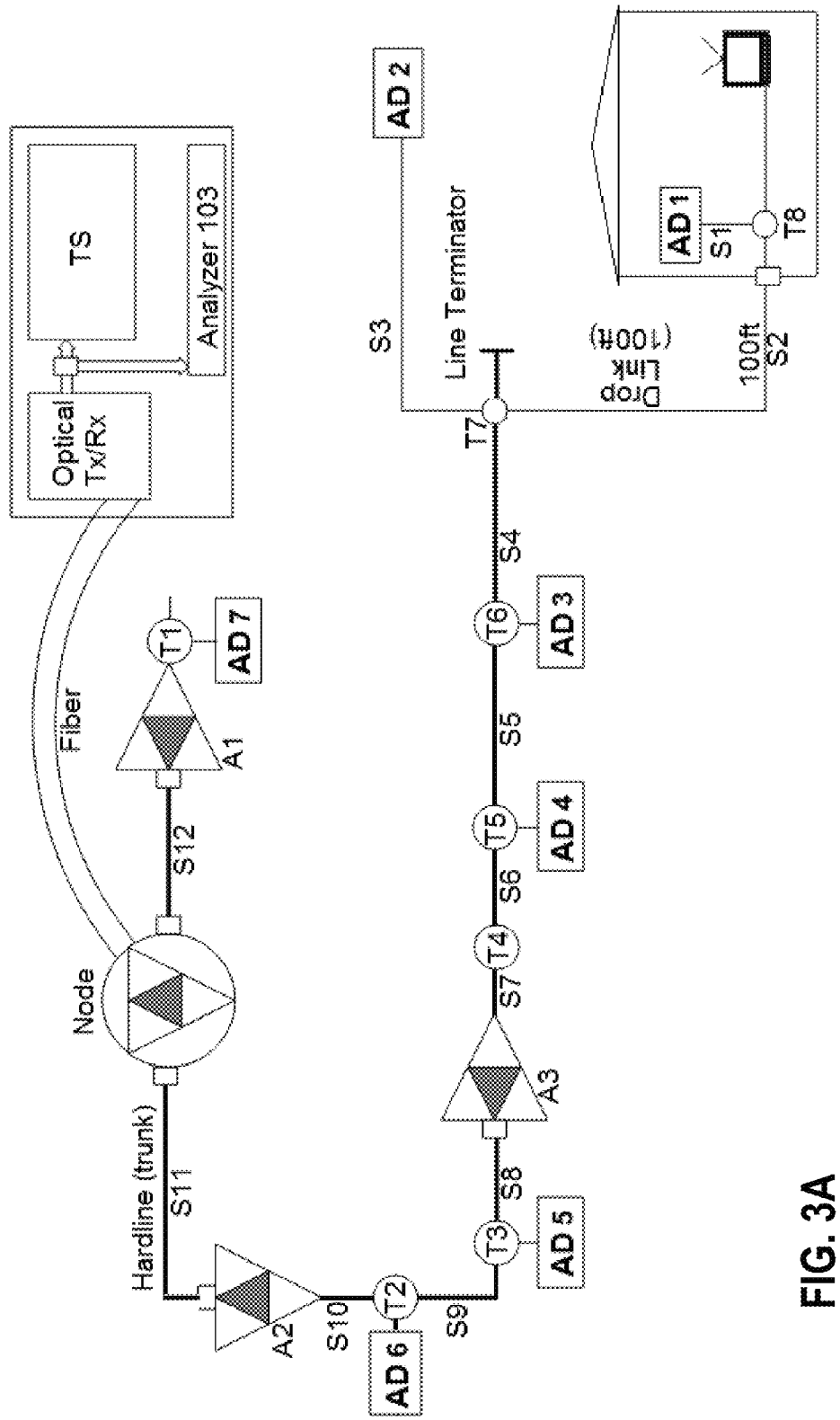
FIGS. 3A-3B include illustrative block diagrams of a branch of the access network in FIG. 1 in accordance with various embodiments.

FIG. 3A includes an illustrative block diagram of a branch of the access network of FIG. 1, in which noise, interference, or another anomaly may be detected according to various embodiments. For purpose of providing a non-limiting example using components relative to a particular network, FIG. 3A is described with respect to a hybrid coax/fiber network, though other networks and components may be used. The network branch may begin at a headend or other termination point that may for example include a termination component (e.g. a cable modem termination system (CMTS)), the previously described analyzer 103, and a bidirectional interface (e.g., an optical transmitter/receiver). The termination point may be coupled to the remainder of the branch via the bidirectional interface through a bidirectional fiber-optic communication path connecting the termination component to a fiber node (e.g., fiber-optic/coax node). The fiber node may include an optical combiner/splitter, which receives downstream optical signals at an optical/RF converter, which drives a modulator, which then transmits RF signals onto the coax network beginning at hardline trunk segments S11 and S12.

The fiber node may also include a de-modulator, which demodulates RF signals received from the coax network and transmits the demodulated signals to an RF/optical converter. The RF/optical converter may then transmit the converted upstream signals to the combiner/splitter, which then transmits the upstream signals to the termination component via the optical fiber path.

The coaxial branch may include a plurality of communication paths S1-S12 interconnected by a plurality of amplifiers A1-A3, taps T1-T6, and combiner/splitters T7-T8. Connected to each tap may be a plurality of access devices AD1-AD7, such as modems, set-top boxes, etc. Although not illustrated, groups of access devices located in different facilities (e.g., apartment, condominium, single family home, duplex, office, plant, etc.) may be connected through multiple taps respectively. Each facility may also include multiple access devices connected to a single tap. While the coaxial branch of the network in FIG. 3A illustrates one topology, other illustrative networks may include additional amplifiers, combiners/splitters, taps, and communication paths, which may connect hundreds, thousands, or tens of thousands of access devices to the network. Additionally, the network may include other optical nodes supporting other coaxial branches, which are not shown for convenience.

Figure 3B:
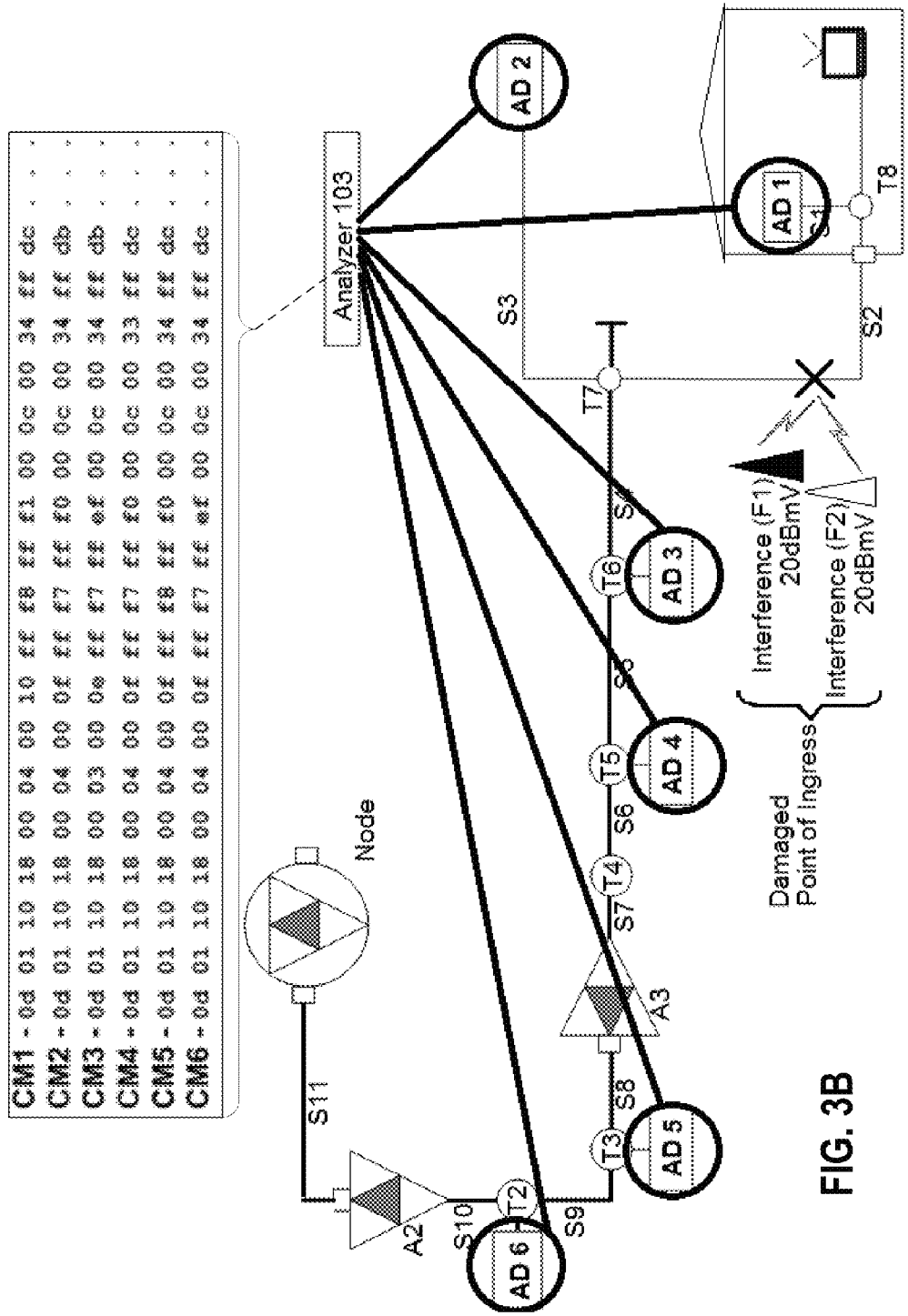

FIG. 3B illustrates the network branch shown in FIG. 3A, according to various embodiments, in which analyzer 103 obtains data regarding signal characteristics in each of multiple communication channels within the access network. Each channel may be associated with an individual access device and can represent a physical path from that individual access device to the fiber node or other signal termination. As illustrated in FIG. 3B, the data acquired by the analyzer may include adaptive equalizer data (e.g., equalization coefficients shown in the table) from each access device connected to the communication channel. The adaptive equalizer data, in some aspects, may include coefficients for post-equalization filters used for correcting downstream communications from the fiber node to each access device. In other aspects, the data may include coefficients for pre-equalization filters used for pre-filtering upstream communications. In yet other aspects, a combination of pre- and post-equalization filter coefficients may be used. The analyzer 103 may collect the data by communicating with each of the access devices through the communication channel. For example, the analyzer 103 may poll each access device for data. In other examples, each access device may report its data to analyzer 103 periodically and autonomously. In other aspects, analyzer 103 may acquire the data from another device that communicates with the access devices to collect the data.

The access network may include multiple different segments separated by the amplifiers, signal combiners/splitters and other hardware, and each physical communication path (i.e., channel) may traverse a number of the segments. Different communication paths may share some segments, and may have other segments that are unique to just one physical path. For example, in FIG. 3B, the communication channel for access device AD3 may include segments S5-S11, taps T2-T6, and amplifiers A2-A3. The communication channel for AD1 may include segments S1, S2, and S4-S11, taps T2-T6, splitters T7 and T8, and amplifiers A2-A3. In this example, the communication channels for AD1 and AD3 differ only by components S1, S2, and S4, and splitters T7 and T8.

In various examples, a communication branch may include one or more sources of noise or signal distortion. For example, as illustrated in FIG. 39, segment S2 may be damaged or otherwise configured to permit the ingress of an external signal into the network. This could be, for example, a damaged coaxial line connecting splitter T7 to splitter T8. The ingress of noise sources may occur at different times, and the noise sources may have different levels of power and may have different frequency components at the point of ingress.

FIG. 3B includes two illustrative sources of noise ingress in segment S2. A first noise source (the black triangle), may for example, have a first frequency F1 (e.g., 600-750 MHz), and induce a 20 dBmV level signal onto segment S2 at the point of ingress. A second noise source (the white triangle) may for example, have a second frequency F2 (e.g., 5-42 MHz), and induce a 20 dBmV level signal onto segment S2 at the same point of ingress. For ease of explanation, various embodiments are described herein with respect to one point of ingress as illustrated in FIG. 3B. In various other embodiments, multiple noise sources through multiple points of ingress may be detected.

A noise source may traverse the network from a point of ingress and reach the receiver of an access device or a receiver of another device connected to the network (e.g., a fiber node, test equipment, etc.). The received noise may cause interference with the intended downstream and upstream communications between the access devices and the fiber node/termination system. In response to the noise, the receiving devices may employ pre-equalization and post-equalization to reduce or eliminate the effects of distortions caused by anomalies in the network. In the context of an equalizer, each "tap" may correspond to a version of a received signal (in post equalization) or a signal to be transmitted (in pre-equalization) that is delayed by a predetermined duration and which is amplified (or attenuated) in accordance with a set of complex coefficients (known as tap coefficients). For example, a first tap may represent a version of the received signal or transmit signal with 0 delay that is modified (e.g., attenuated or amplified) in accordance with a first set of tap coefficients, a second tap may represent a version of the received signal having t delay that is modified in accordance with a second set of tap coefficients, etc. The outputs of the taps are typically summed to create (for pre-equalization) a pre-equalized signal that is then transmitted across the network, or (for post-equalization) a post-equalized received signal that is processed by the receiving device. In many cases, the tap coefficients can be adjusted on an adaptive basis so as to compensate for changes in network conditions. The number of taps, the temporal delay between taps, the manner of determining tap coefficients, and other parameters can vary among (and sometimes within) different equalization schemes.

For example, an access device may adjust its post-equalization coefficients to compensate for downstream noise. Similarly, a termination system or other hub device may analysis received upstream noise, and direct the access devices to adjust their pre-equalization coefficients to correct for the upstream noise.

FIGS. 4A-4B include illustrative graphs of equalizer coefficients in accordance with various embodiments. FIG. 4A includes a graph for an illustrative access device having a 40 tap post-equalization filter, with each tap listed across the x-axis in order of time delay, and the gain in decibels of each tap listed up the y-axis. For illustration purposes, taps 1-13 include coefficients for a feed-forward portion of the equalization filter (FFE), tap 13 is the zero delay point, and taps 14-40 include coefficients for a decision feedback portion of the equalizer filter (DFE).

The FFE portion acts a finite-impulse response filter, with the output being the sum of each tap coefficient multiplied by the signal after a number of tap delays indicated by the tap number. In the FFE, an algorithm adjusts the coefficients based just on evaluation of the filter output to remove inter-symbol interference. Like the FFE portion, the DFE portion may also be a FIR filter. With the DFE however, the algorithm adjusts the coefficients based on additional decisions about what the symbols transmitted in the signal are after filtering. In the DFE portion after the signal passes through the filters, a value is obtained (e.g., 0.7 normalized on a scale of 0 to 1), and a decision is made about what symbol the filtered signal represents (e.g., a "0" or a "1"). For the DFE portion, the error between the filtered signal (e.g., 0.7) and the decided value (e.g., 1) is used in the algorithm for adjusting the coefficients.

In various embodiments, analyzer 103 may acquire the filter coefficients from the access devices at different moments of time. For momentary noise sources, the coefficients of an access device receiving the noise may adapt its coefficients to compensate for the changing environment. FIG. 4A illustrates equalizer coefficient values for an access device when a momentary noise source is not being received, and FIG. 4B illustrates the equalizer coefficient values of the same access device when receiving the momentary noise source. Changes in the coefficients can be seen predominantly in taps 27 through 40, which are highlighted by the oval. These coefficients may be, for example, from access device AD1 receiving noise F1 and F2 illustrated in FIG. 3B. In other examples, other tap values may change.

By analyzing such changes, various embodiments may determine a location of noise ingress along one or more paths in the access network. Various examples include the analyzer 103 obtaining multiple samples of adaptive equalizer data from one or more access devices, and detecting changes in the adaptive equalizer data over time in order to determine the presence and/or location of noise ingress.

Figure 5:
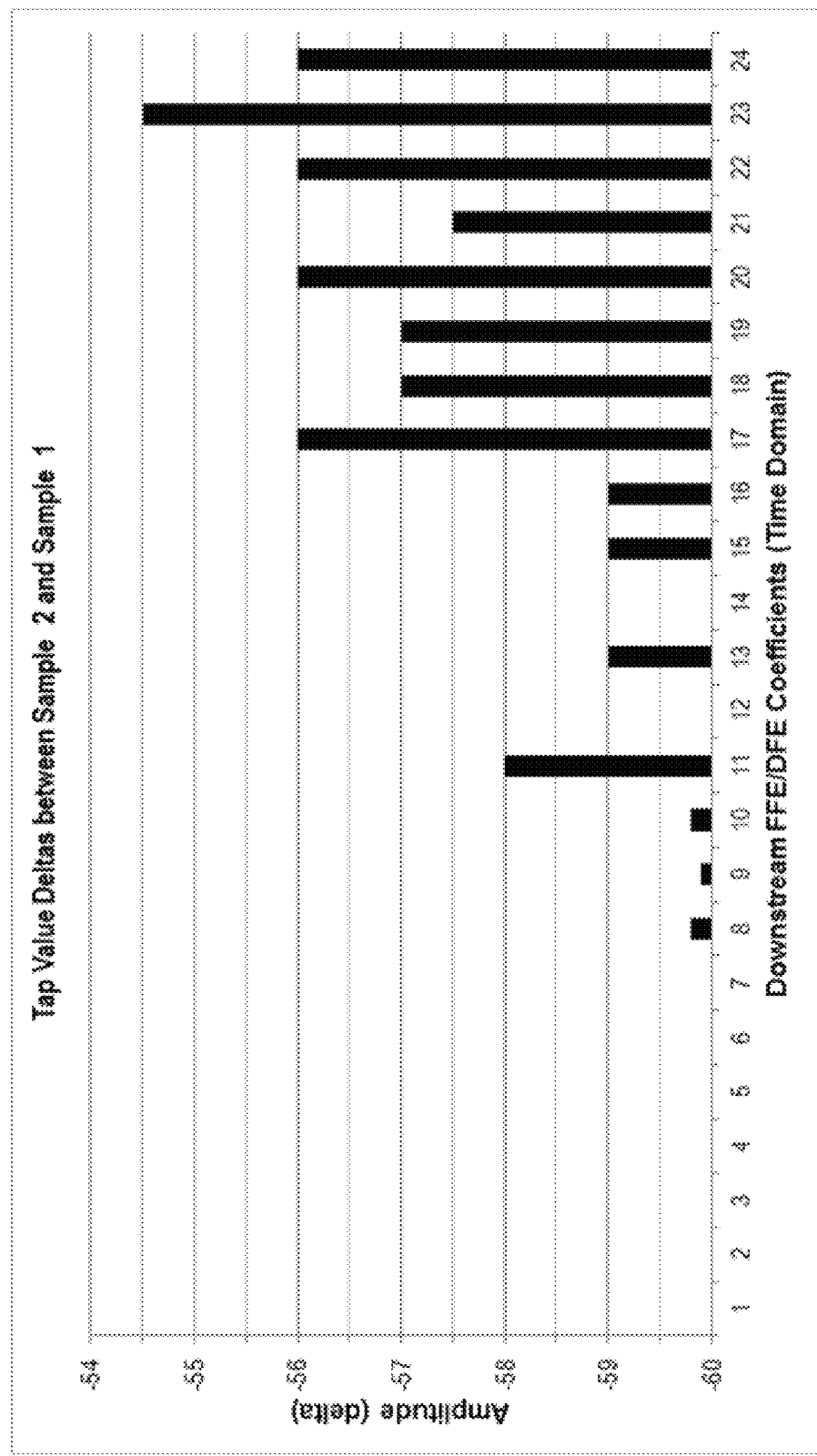
FIGS. 5-6 include illustrative graphs of changes in equalizer coefficients in accordance with various embodiments.

FIG. 5 depicts the results of an illustrative analysis of changes in the equalizer coefficients of FIGS. 4A and 4B. FIG. 5 illustrates just the DFE portion of the equalizer, with taps 17-40 in FIGS. 4A-4B renumbered as taps 1-24 in FIG. 5. Various algorithms can be applied to analyze the differences. In FIG. 5, for example, the magnitude difference of each tap from FIG. 4A to FIG. 4B is illustrated relative to a −60 dB floor (e.g., $\Delta h_{dfe}$=−60 dB+abs($h_{dfe}$[t1]−$h_{dfe}$[t2]).

Figure 6:
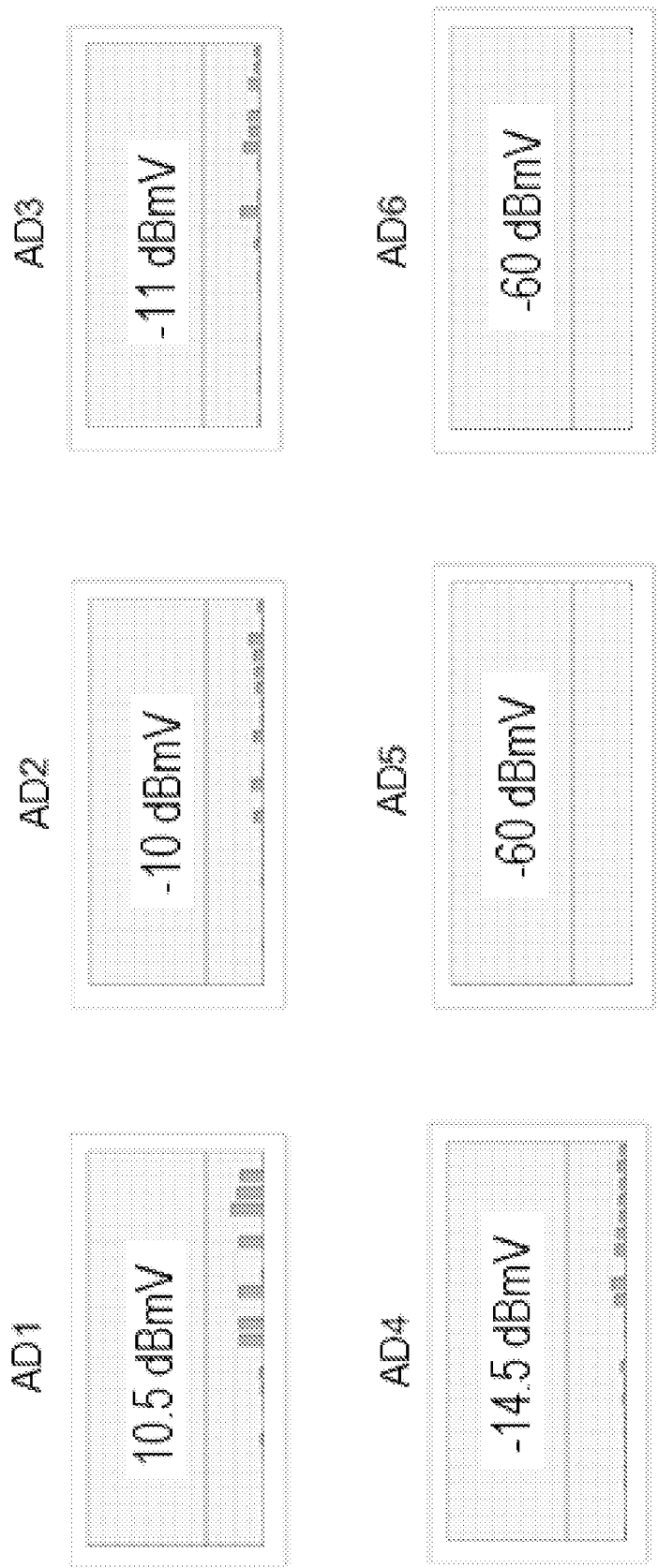

As a noise source propagates through the network, the noise will be attenuated, amplified, and/or distorted through line loss and through network components such as splitters, taps, amplifiers, etc. As such, different access devices having different physical paths to the noise source, will exhibit different changes to their respective equalizer coefficients. FIG. 6 depicts an illustrative example of the different magnitude changes in tap values for access devices AD1-AD6 as a result of the ingress of noise source F1 depicted in FIG. 3B, for the same delta period in time over which the tap values are acquired. The charts in FIG. 6 are of the same scale as illustrated in FIG. 5, and show that the result may be different for each AD (exact values are not shown for simplicity). Various aspects compare these differences between access devices to determine a location of noise ingress and/or to identify a type of noise source.

Various algorithms may be used to compare tap values. In one variation, the tap values illustrated in FIGS. 4A and 4B represent the vector sum (or magnitude of the vector sum) of the real and imaginary parts of the tap values, and the values in FIGS. 5 and 6 represents a complex division of each tap value from first and second time samples. In other variations, the tap values at the first and second time samples may be compared by simple subtraction. From the subtraction or complex division of the tap values (e.g., tap value deltas $\Delta h_{dfe}$), a summing algorithm may be applied to the tap value deltas of an access device to derive a single interference value for each access device. In various embodiments, the summed value may be the vector sum of tap value deltas, a sum of squared tap value deltas, a root mean square (RMS) sum of the tap value deltas (e.g., interfere=rms($\Delta h_{dfe}$)), an absolute value RMS sum of tap value deltas, or may be some other measure that takes into account one or more tap value deltas of an access device. In one embodiment, using the RMS sum of the complex division values, an estimate in the change of noise amplitude or power may be obtained.

In other variations, a summed value (e.g., vector sum, sum of squared values, RMS, abs RMS, etc.) may be determined for the set of tap values themselves at the first and second sample times, respectively, and then a difference (e.g., subtraction, vector division, etc.) of the summed tap values may be used to compare noise received at different access devices.

In other variations, a time sequence of multiple tap samples may be taken, and a sum of difference values or a difference in summed values as described above between sequential samples may be determined, which generates a time sequence of values for each access device. The time sequence of values may be used to compare noise received at different access devices, e.g., a noise reception level.

In yet other variations, the tap values and/or differences in tap values may be transformed to the frequency domain through a Fourier transform (e.g., fast Fourier transform), or other algorithm to determine frequency components and properties of the noise signals. From the frequency information, the noise may be characterized as originating from a specific type of source (e.g., LTE transmitter, electric motor, etc.).

In FIG. 6, on each graph is printed one example of a sum value, which is an absolute value of the RMS sum of complex division values, which represent a noise power estimate in decibel millivolts for each access device.

Figure 7:
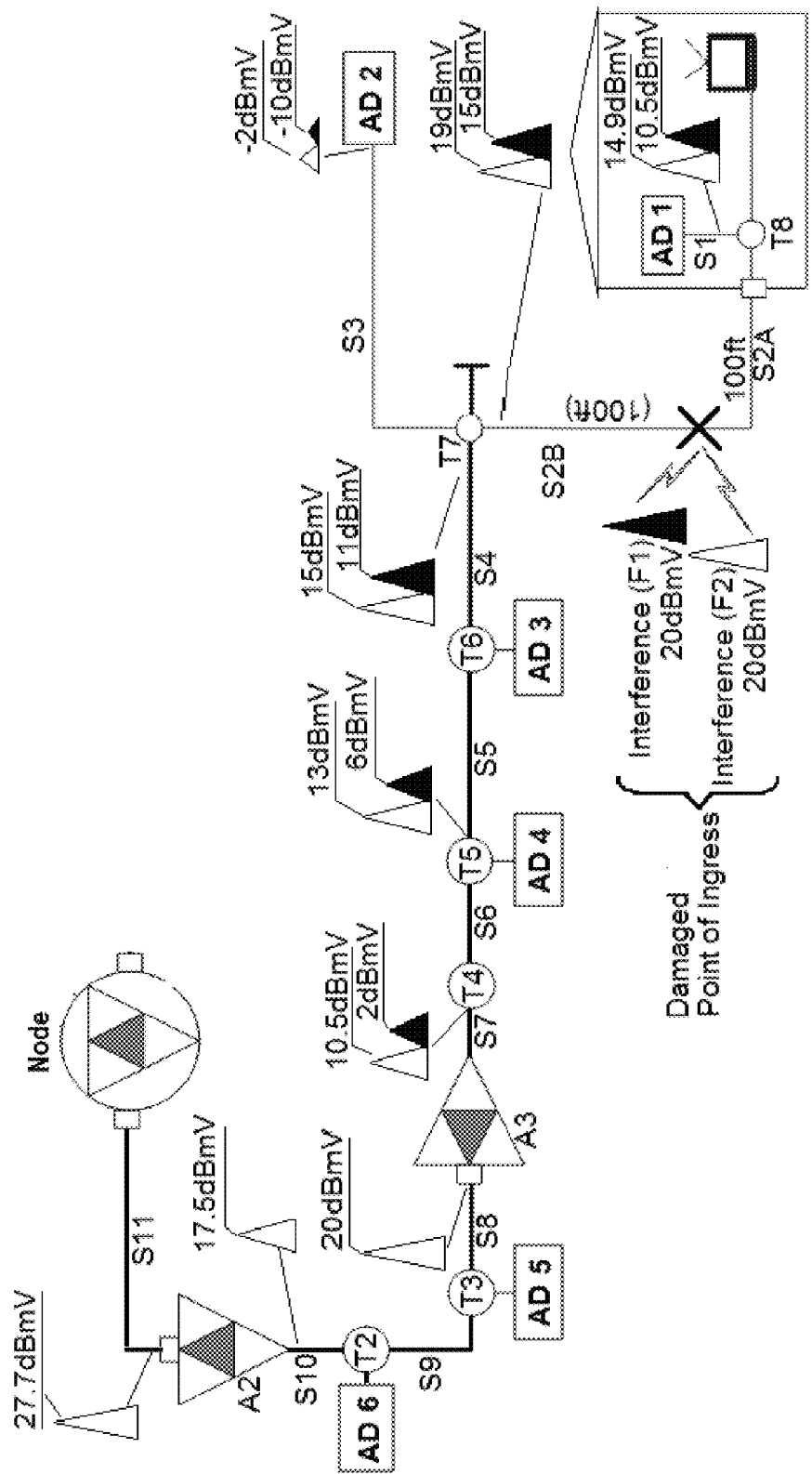
FIG. 7 includes the access network branch of FIGS. 3A and 3B with illustrative attenuations of a noise source according to various embodiments.

As previously mentioned, as a noise source propagates through the network, the noise will be attenuated, amplified, and/or distorted through line loss and attenuation through network components such as splitters, taps, amplifiers, etc. FIG. 7 depicts the access network branch of FIGS. 3A and 3B with illustrative attenuations of the two noise sources F1 (e.g., 600-750 MHz) and F2 (e.g., 5-42 MHz) at various points along the communication path. The attenuation by each component may depend on the component function, structure, electrical properties, signal frequency, signal propagation direction, other signal properties, and combinations thereof. For example, a cable (e.g., RG6 coaxial cable) may attenuate a 5-42 MHz signal by approximately 1 dB for every 100 feet of cable length and attenuate a 600-750 MHz signal by approximately 5 dB for every 100 feet of cable length. Taps T1-T6 may have an approximate insertion loss of 1 dB and a tap isolation of 20 dB for signals in the range of 5-750 MHz. Splitters T7 and T8 may have an approximate 4 dB insertion loss and a 20 dB tap isolation for signals in the range of 5-750 MHz. Amplifiers A1-A3 may be configured to amplify signals in both directions, but the direction of amplification may be frequency selective. For example, in a coaxial system compliant with Data Over Cable Service Interface Specification (DOCSIS) standards, amplifiers A1-A3 may be designed to block upstream signals in the frequency range of 600-750 MHz, but amplify signals by a gain factor G (e.g., 10 dB) in the 5-42 MHz range. These attenuation and gain values are illustrative only, and other values may be applied based on the characteristics of the specific network of the various embodiments.

Based on the example attenuation values above, the levels of F1 having a frequency in the 600-750 MHz range and F2 having a frequency range of 5-42 MHz are depicted propagated on different segments of FIG. 7. F1 for example propagates to segment S7 attenuated by 18 dBmV (e.g., −SdBmV from S2B, −4 dB from T7, −2 dB from S4, −1 dB from T6, −2 dB from S5, −1 dB from T5, −2 dB from S6, and −1 dB from T4). Beyond S7, however, F1 may be blocked by amplifier A3 from propagating to segment S8, because F1's frequency is outside the upstream operating frequency of A3. F2 in contrast may propagate to S8 with a 10 dBmV attenuation plus an amplification of 10 dBmV, the gain of A3 in the upstream direction (e.g., 1 dBmV from S2B, −4 dB from T7, −1 dB from T6, −1 dB from T5, and −1 dB from T4, +10 dBmV from A3).

FIG. 8A illustrates process 800 that may be performed in accordance with one or more embodiments to identify and/or locate a noise source in a network. The process begins at step 810 in which a computing device, such as analyzer 103, obtains and stores data that characterizes the communication paths between one or more of access devices AD1 through AD6 and the fiber node (or other termination device) at the beginning of the network branch. In at least some embodiments, this data includes the pre-equalizer tap coefficients and/or post-equalizer tap coefficients from one or more of the devices AD1 through AD6. While six access devices are shown, any number of devices (i.e., ADn) may be present.

In some embodiments in step 810, the computing device (e.g., the analyzer 103) includes a database storing the tap coefficients currently being used by each of access devices AD1 through AD6 (and/or other access devices). Analyzer 103 may obtain these tap coefficients using a query, e.g., one or more SNMP (simple network management protocol) queries, directed to the termination system or other hub device. In embodiments in which the network is operated in accordance with a specification or standard, such as one or more Data-Over-Cable Service Interface Specification (DOCSIS) standards, for example, a termination system or other termination system monitors communications from cable modems. Based on the quality of the received signals, the termination system individually determines (and provides) the tap coefficients to be used by each modem for pre-equalization of upstream communications. The termination system may also query the cable modems for post-equalization tap coefficients. The termination system can thus maintain a record of the tap coefficients each modem is currently using. In other embodiments, analyzer 103 may obtain pre- and post-equalization tap coefficients from a network element other than the termination system, and/or may obtain those coefficients directly from access devices.

FIGS. 9A-9B shows a portion of a database 150 generated by analyzer 103 and stored in memory 202. For convenience, FIGS. 9A-9B show data in a simple table. The table of FIGS. 9A-9B is merely one example of how data can be arranged in accordance with various embodiments. The actual format of data and/or of the tables or other data structures used to organize that data will vary among different embodiments. Each row in table 150 corresponds to a specific one of the access devices AD1 through ADn. The cells of each row contain data related to the corresponding access device and to the communication path used by the corresponding access device to communicate with the fiber node or other termination device. Cells in a first column 151 contain index numbers for table 150 rows. In the present example, row 00001 corresponds to device AD1, row 00002 corresponds to device AD2, etc. Fields in column 152 contain identifying data for an access device on a particular row. In some embodiments, this identifying data is a media access control (MAC) address of the access device. For each of columns 153-1 through 153-P, a cell on a particular row contains a set of tap coefficients for one of the post-equalizer taps of the access device corresponding to that row. Similar columns may be present for pre-equalizer taps. "P" represents an arbitrary number and will depend on the type of pre- or post-equalization scheme being used. In some embodiments, for example, P equals 40, corresponding to the post-equalization tap coefficients 1 through 40 illustrated in FIGS. 4A and 4B. Each set of tap coefficients may have a real ("r") and imaginary ("i") component, with those components represented generically as "<r>" and "<i>". Although not shown in FIG. 9A, each of columns 153-1 through 153-P may include a row on each field that can hold a value to indicate whether a particular tap is the "main" tap (i.e., the tap corresponding to a zero time delay). At the end of step 810 (FIG. 8A), each row of table 150 contains an identifier and up to P sets of tap coefficients for one of access devices AD1 through ADn.

Analyzer 103 repeats step 810 collecting and storing table 150 for multiple iterations. The iterations may be periodic, occurring at a predetermined rate, or may occur on a varying rate basis (e.g., as fast as data can be collected). Analyzer 103 may store every iteration of data, or may store only the most recently collected (e.g., the most recent 2, 3, 4, etc. iterations). Table 150 may store in each row a time (not illustrated) at which the iteration was captured, which may be an absolute time, or may be a time relative to a prior iteration. For two different iterations of collected tap values at different moments in time, analyzer 103 in step 820 generates comparison data for each tap of each access devices AD1 through ADn, as described above with respect to FIGS. 5 and 6 (e.g., tap 2 of AD1 at time 1 compared to tap 2 of AD1 at time 2). As illustrated in FIG. 9B, columns 154-1 through 154-P include the comparison value, <d>, for taps 1 through P respectively, for each access device 152. The comparison data may be calculated from consecutive iterations, may be calculated from two non-consecutive iterations, or may be calculated from more than two consecutive or non-consecutive iterations. Additional data (not shown) may be included for each row, such as the difference in time(s) between the iterations on which columns 154-1 through 154-P are based. The subset of the values in 154-1 to 154-P may, for example, be those represented in FIGS. 5 and 6. In step 820, a single value for each access device may be calculated from the comparison values of the respective set of taps for each access device. The single value may be calculated as described above with respect to FIGS. 4A, 4B, 5 and 6 (e.g., abs(rms<d>)), and may be representative of noise received at the access device. Column 155 illustrates the single values, <s>, for each access device, which may represent a noise reception level at that access device. The single value of an access device could be, for example, the absolute value of the RMS sum of the difference values <d> for that access device (e.g., the values in each graph of FIG. 6), which may be complex division values calculated between two iterations of tap values.

In certain variations, step 820 may include characterizing frequency components of the noise source based on the tap values 153-1 to 153-P or comparison values 154-1 to 154-P. For example, in some embodiments, analyzer 103 may perform a Fourier transform on one or more of the tap values 153-1 to 153-P or comparison values 154-1 to 154-P. In some embodiments, analyzer 103 may perform a Fast Fourier Transform (FFT) (e.g., a 100 point FFT), although other types of transforms can also be used. The transform may generate a frequency domain representation of the frequency response of the noise received at the access device. One or more values indicating the frequency response (or inverse frequency response) may be stored. The stored frequency data for each access device is illustrated as <f> in column 156 of FIG. 9B. For example, center frequencies of more or more peaks in the frequency response of the noise received at an access device may be stored as <f>.

Analyzer 103 may repeat step 820 periodically as new data is collected based on the iteratively collected data in step 810. Analyzer 103 may store every iteration of data in 154-1 through 154-P, 155, and/or 156, or may store only the most recently collected (e.g., the most recent 2, 3, 4, etc. iterations).

During each iteration, analyzer 103 may retrieve data for one or more access devices AD1 through ADn, generate comparison and summed values for those access devices, and generate a time sequence of values in step 830. In some embodiments in step 830, the computing device (e.g., analyzer 103) stores the time sequence of values in a database 160, such as the one illustrated in FIG. 9C. For convenience, FIG. 9C shows data in a simple table. The table of FIG. 9C is merely one example of how data can be arranged in accordance with various embodiments. The actual format of data and/or of the tables or other data structures used to organize that data will vary among different embodiments. In some variations, database 160 is a portion of database 150. In each row of database 160, an index 161 and access identifier 162 is included similar to those of FIGS. 9A and 9B. Columns 163-1 through 163-T include a set of values for each time iteration. One value, labeled <t> includes a start, end, medium, or other time at which the iteration is captured and calculated within a margin of error (e.g., delta t). The other value in each column may include the single value <s>, e.g., noise reception level, and frequency data <f> as calculated in columns 155 and 156 of FIG. 9B. In alternative embodiments, each column may include only one value <t> for all of the rows in that column, instead of storing a separate <t> value for each row. The number of iterations T may be any value and will depend on the available resources. In some variations, the columns 163-1 to 163-T may operate as a circular buffer (e.g., FIFO) storing the most recent T iterations.

In step 840 in FIG. 8A, one or more noise reception levels <s> of column 155 in FIG. 9B and/or in columns 163-1 to 163-T of FIG. 9C may be compared to a predetermined threshold value. A comparison of a noise reception level <s> above the threshold may indicate the momentary ingress of noise at some point in the network branch as shown in FIG. 7. The predetermined threshold value may be the same or different for each access device, and may be autonomously adapted based on a previous comparison or previous values of <s> for one or more access devices. For example, noise reception levels for one or more access devices on a network branch may be averaged over a period of time to determine and average value at an access device, and the threshold value for detecting a momentary noise source may be adjusted based on the average value. In certain variations, for a particular access device, one or more comparisons of <s> to the threshold value over several iterations may be used to detect the ingress of a momentary noise source (e.g., 3 out of 5 positive comparisons).

In response to at least one noise reception level <s> being determined to be above the threshold, in step 850, one or more noise reception levels <s> from respective multiple access devices for the same time interval <t> are designated for use in detecting the noise ingress location. In some variations, only access devices with noise reception levels <s> above the threshold are designated for detection of a noise ingress location. In other variations, access devices with noise reception levels <s> below the threshold, but near an access device with a noise reception level <s> above the threshold are also included for the analysis. In further variations, all access devices on a network branch having at least one access device with a noise reception level <s> above the threshold are designated for analysis.

For one or more of the access devices designated in step 850, noise attenuation as a function of the location of noise ingress in the network branch may be determined in step 860. For example in FIG. 7, for each physical location along the network branch at which the ingress of noise may occur into the network branch, an attenuation factor AF may be calculated for a given access device. The attenuation factor AF may be a multiplier or non-linear formula that indicates the attenuation of the noise signal when it reaches the access device. As illustrated in FIG. 7, for example, a noise source F1 entering between S2A and S2B may be attenuated by 9 dBmV at AD1. For a given access device (e.g., ADn), an attenuation factor AFn may be expressed as a function of physical location of the noise ingress on the network branch and/or a function of frequency of the noise source (e.g., AFn[location, frequency]). The measure of noise (e.g., noise reception level <s>), at a particular access device (e.g., n), for a particular noise source (e.g., F1), may be determined by the noise level (e.g., N) at the point of ingress multiplied (or added in decibels) by the attenuation factor AFn (e.g., <s>=N dBmV+AFn dB). In various embodiments, the noise level at the point of ingress, N, and noise reception levels <s> may represent power, voltage, or current, and may be a maximum, peak, RMS, or other average value. Further, while AFn is expressed as a multiplication factor above, <s> may be determined as a non-linear function of N, position, and frequency.

In 860, the attenuation factor AFn for the access devices may be stored in a database 190 as illustrated in FIG. 9D. For convenience, FIG. 9D shows data in a simple table. The table of FIG. 9D is merely one example of how data can be arranged in accordance with various embodiments. The actual format of data and/or the tables or other data structures used to organize that data will vary among different embodiments. For each access device, a row entry is included that contains an index 191 uniquely identifying the entry, an access device identifier 192, and an attenuation factor AFn. One example of determining an attenuation factor for each access device is shown in shown in FIG. 8B.

In step 861 of FIG. 8B, interconnection of all of the components in the network branch are identified, mapped, and/or stored in a database generated by analyzer 103 or other computing device (e.g., FIG. 2). One example of such interconnect data is illustrated in the database 180 illustrated in FIG. 9E. For convenience, FIG. 9E shows data in a simple table. The table of FIG. 9E is merely one example of how data can be arranged in accordance with various embodiments. The actual format of data and/or of the tables or other data structures used to organize that data will vary among different embodiments. In database 180, one or more points of interconnection (i.e., nodes) between two components that affect noise transmission and/or attenuation of noise to an access device is listed as a node in column 181. For each node, the associated row in the database 180 includes connection information for one or more devices connected to the node. The devices are listed in columns across the rows. In a first column 182-1, the first device for each node is listed along with a terminal of that device that is connected. For example, in the Node 1 row, the first device FN represents the fiber node illustrated in FIG. 7, with the terminal 1 (i.e., terminal connected to S11) of the fiber node FN listed as connected to Node 1. A second column, 182-2, lists a second device (if one exists) connected to the node. In the Node 1 row, for example, column 182-2 lists the first terminal of branch segment S11 connected to Node 1. Although not shown, additional columns may be included to illustrate additional devices connected to each node. Although illustrated as a table, the interconnection data may be represented in other forms, such as a schematic or wiring diagram.

From database 180, noise signal paths from one or more locations (e.g., every location) in the network to an access device may be identified and/or mapped in step 862. For example, from the location marked by an X between S2A and S2B in FIG. 7, a signal path can be mapped to AD4 as traversing 100 feet of S2 (e.g., S2B), through T7, through the entire length of S4, through T6, through the entire length of S5, through T5, and to AD4.

In step 863, signaling characteristics for one or more components in the network branch are retrieved from a database 170 as shown in FIG. 9F. For convenience, FIG. 9F shows data in a simple table. The table of FIG. 9F is merely one example of how data can be arranged in accordance with various embodiments. The actual format of data and/or of the tables or other data structures used to organize that data will vary among different embodiments. In database 170, each row includes electrical characterization data for a different component. In the present example, the first row includes data for access device AD1. In column 171, an index number is included in the cell that uniquely identifies each row, and in column 172, a component identifier associated with the respective component is included in each cell of the row. The cells in columns 173-1 to 173-4 include parameters for each component. While four columns are shown storing parameters, each row associated with each component may have more or less than four parameters. For example, in row 6 access device AD6 is shown as having two parameters made up of a parameter name (e.g., sig loss) and an associated value (e.g., 5 dB). The first parameter, Type, indicates that AD1 is an access device. The second parameter represents the signal loss attributable due to the path between the access device input and the next identified component in the network branch (e.g., T2).

In another example in database 170, row 7 illustrates signal characteristics of network branch segment S1 illustrated in FIG. 7. In this example, segment S1 includes four different parameters. The first parameter, Type, indicates that S1 is an RG-6 coaxial cable. The second and third parameters indicate signal attenuation through S1 as a function of length and frequency. In row 7 column 173-2, attenuation of signals in S1 is given as 1 dBmV per 100 feet of cable for signals in the 5 to 42 MHz range. In row 7 column 173-3, attenuation of signals in S1 is given as 5 dB per 100 feet of cable for signals in the 0.6 to 0.75 GHz range. The given frequency ranges and attenuations are only one example, and other embodiments may have other ranges, more or less ranges, and other attenuations. In row 7 column 173-4, the entire length of S1 is given as 10 ft. Rows 8-18 illustrate similar parameters for other segments in the network branch.

In rows 19 and 20 of database 170, FIG. 9F illustrates parameters for amplifiers A2 and A3. In these examples, amplification is given for each amplifier for two different frequency ranges in two different directions. Row 19 column 173-2, for example indicates that amplifier A2 amplifies signals in the 5 to 42 MHz range by 10 dBmV in the upstream direction, but attenuates signals in the same frequency band by 60 dBmV in the downstream direction. Row 19 column 173-3 indicates that amplifier A2 amplifies signals in the 0.6 to 0.75 GHz range by 10 dBmV in the downstream direction, but attenuates signals in the same frequency band by 60 dBmV in the upstream direction. In rows 21 through 27, insertion loss (column 173-2) and tap isolation (column 173-3) are illustrated for taps/splitters T2-T8. The cell entries of table 170 are only a few examples, and other components and other parameters may be specified. For example, further effects on signal frequency, such as phase shift, phase-frequency distortion, frequency tilt, etc.), caused by each component may also be indicated as parameters.

Returning to FIG. 8B, in step 864 the signaling characteristics retrieved in step 863 are associated to the identified signal paths in step 862 to determine the noise attenuation as a function of noise ingress location and frequency. In various examples, step 864 results in the attenuation factors of FIG. 9D. In various examples, the attenuation factor AFn, may be represented as a piecewise function or pseudo-code, with different portions of the function/code given for various ranges of locations along the network branch and for various ranges of signal frequency. For example, for locations of noise ingress along S2, the function of AF4 may be:

If (noise ingress location = S2) AND (frequency = 5-42 MHz), than
    AF4 = -C1 -C2 -C3 -C4 -C5 -C6 -C7; where,
        C1 = (length along S2 starting from T7) x 1 dBmV/100 ft;
            (e.g., S2 attenuation loss)
        C2 = 4 dBmV; (e.g., insertion loss of T7)
        C3 = 100 ft x 0.5 dBmV/100 ft; (e.g., insertion through S4)
        C4 = 1 dBmV; (e.g., insertion loss of T6)
        C5 = 100 ft x 0.5 dBmV/100 ft; (e.g., insertion through S5)
        C6 = 1 dBmV; (e.g., insertion loss of T5)
        C7 = .5 dB; (attenuation from T5 to AD4).

The terms C1 through C7 to be included in AF4 may be determined from connection information in FIG. 9E and the values of each term may be determined from the electrical characteristics in FIG. 9F.

As described above, attenuation (e.g., attenuation factor AFn) may be a function of noise ingress location and of frequency. In various embodiments, the frequency data <f> in the tables of FIGS. 9B and 9C may be used. For noise ingress location, various embodiments may use location data in different forms. In some examples, location could be expressed as the component where the ingress of noise occurs (e.g., S2, 100 ft from T7). In another example, position could be expressed as total physical distance from the fiber node where the ingress of noise occurs (e.g., 1200 ft). If the network branch includes more than one sub-branch, the sub-branch may also be identified (e.g., 1200 ft, branch S2).

Figure 10:
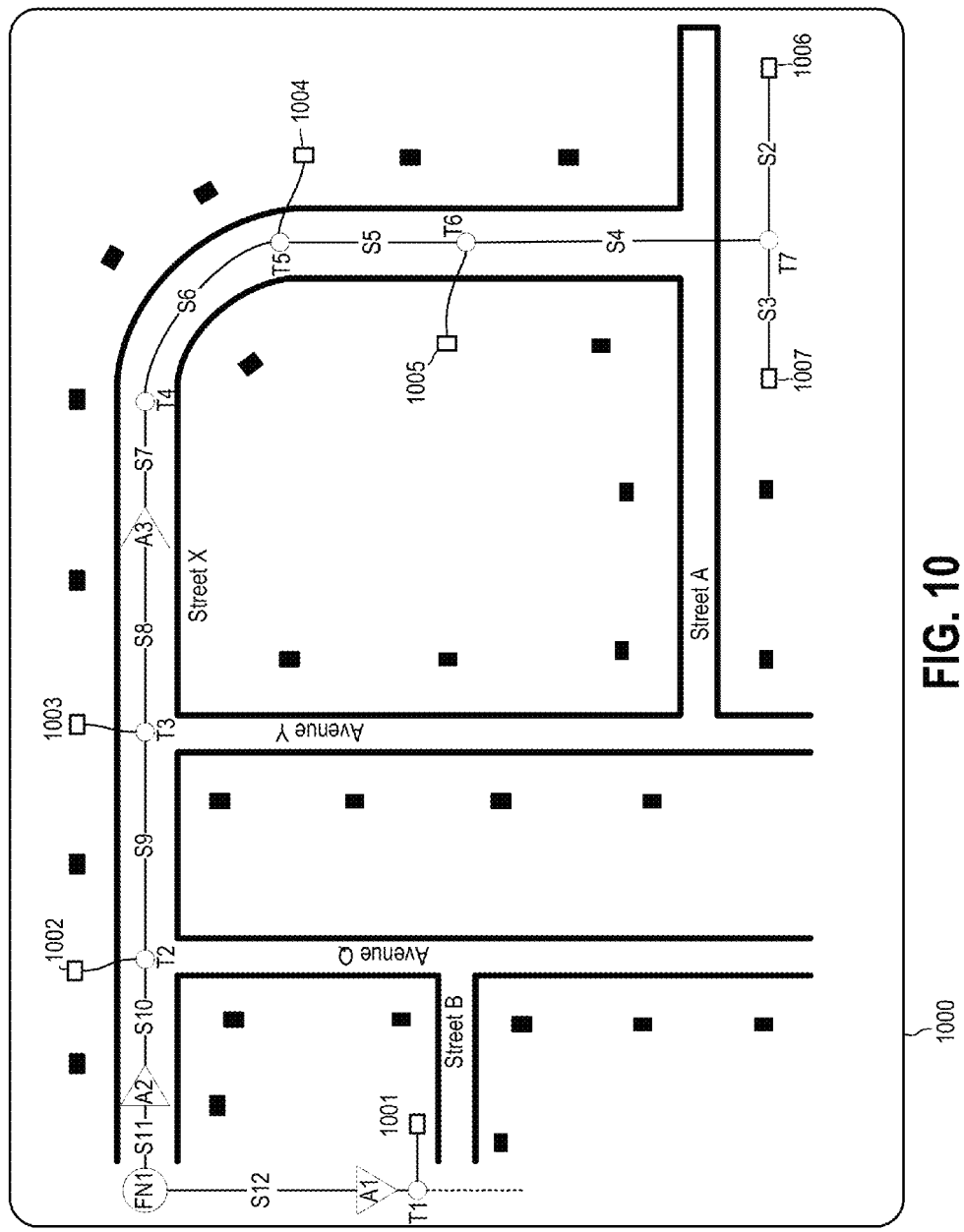
FIG. 10 illustrates a representation of a geospatial map in accordance with one or more embodiments.

In another example, location may be expressed as a geospatial location (e.g., latitude, longitude), which could then be mapped to a specific location within the network branch. In certain embodiments, database 170 in FIG. 9F may include additional parameters that describe the geospatial location (e.g., latitude and longitude) of the various components, or portions thereof. In another example, geospatial location information may be mapped to the network branch with a visual map. For example, FIG. 10 illustrates a geospatial map 1000 of a neighborhood with the geospatial locations of the network branch in FIG. 7 shown. In FIG. 10, several components of the network branch are shown in the physical location in which they exist within the neighborhood. Buildings and structures, e.g., 1001-1006, are shown which may contain some network branch elements such as splitters and access devices. For example, building 1006 may include splitter T8, segment S1, and access device AD1. Map 1000 may include textual information, icons, and/or other indicators (not shown), which indicate network branch components in particular structures. For example, a portion of the table in FIG. 9E may be included in map 1000, which describes the interconnection of splitter T8, segment S1, and access device AD1, within structure 1006. In various embodiments, map 1000 may take the form of an interactive interface displayed on a monitor or other display device. When a component illustrated on the map is selected, for example, information (e.g., information from the tables in FIGS. 9A-9F, longitude, latitude, etc.) may be displayed in the form of a pop-up window or other textual display.

At the completion of step 864 in FIG. 8B, the process may return to step 870 in FIG. 8A. In step 870, the ingress location of a noise source is determined based on noise attenuation factors and the noise reception levels <s> and/or frequency data <f> for multiple access devices over one or more time iterations. For example, for a given time iteration, for a designated access device, the relationship between the noise reception level <s> and noise ingress level N may be calculated as follows (in decibels).

$$<s>=(N+AFn[\text{location},<f>])=>N=(<s>-AFn[\text{location},<f>])$$

If multiple designated access devices (e.g., AD1 and AD2) detect the same noise source N, than the relationships above can be used to calculate the location of noise ingress. For example, using AD1 and AD4, the following relationships may be established.

$$(<s1>-AF1[\text{location},<f1>])=N=(<s4>-AF4[\text{location},<f4>])$$

Given that the noise reception levels at AD1 (e.g., <s1>) and AD4 (e.g., <s4>), the frequency data at AD1 (e.g., <f1>) and AD4 (e.g., <f4>) and the attenuation factor functions at AD1 (e.g., AF1) and AD4 (e.g., AF4) have been determined and may be retrieved from the tables in FIGS. 9B-9D, and all terms of attenuation factors are known from the tables in FIGS. 9E-9F, location of the noise ingress may be solved from the above relationship. When using two designated access devices, a single solution for location may be calculated. For example, formulas for AF1 and AF4 for a noise source in the location of segment S2 and in the frequency range of 5-42 MHz may be as follows:

$$AF1 = -(200 \text{ ft} - loc * 1 \text{ dB}/100 \text{ ft}) - 4 \text{ dBmV} - 0.1 \text{ dBmV};$$
$$= +(loc/100 \text{ ft}) * 1 \text{ dB} - 6.1 \text{ dB};$$

$$AF4 = -(loc * 1 \text{ dB}/100 \text{ ft}) - 4 \text{ dBmV} - 0.5 \text{ dBmV} -$$
$$1 \text{ dBmV} - .5 \text{ dBmV} - 1 \text{ dBmV} - 0.5 \text{ dBmV};$$
$$= -(loc/100 \text{ ft}) * 1 \text{ dB} - 7.5 \text{ dB};$$

where (loc=location=distance along S2 from T7).

Given a noise reception level at AD1 of <s1>=14.9 dB, and a noise reception level at AD4 of <s4>=11.5 dB, then location can be calculated as follows:

$$(14.9-(loc/100\text{ft})*1\text{dB}+6.1\text{dB})=(11.5+(loc/100\text{ft})*1\text{dB}+7.5\text{dB});$$

loc=location=100 ft from T7 on S2.

In various embodiments, the formula above or other relationships may be used for more than two designated access devices. In such a case, various algorithms may be used to calculate the best-fit solution for a location that satisfies the relationships.

In the various examples above, the frequency data (e.g., <f1> and <f4>) may be the same, since it is generated from the same noise source. In other embodiments, as previously noted with respect to FIG. 9F, various components may induce distortions in the frequency. In such cases, the frequency data at different access devices may be different. Nonetheless, using frequency parameters from the table in FIG. 9F, the distortions may be accounted for in the formulation of the attenuation factors.

In certain variations, the determined location of noise ingress may be transmitted to a remote device and/or displayed on an interactive map (e.g., FIG. 10) on a display device that provides a geospatial location (e.g., latitude, longitude) of the point of ingress. For example, one or more servers (e.g., analyzer 103) may perform the steps of FIGS. 8A and 8B, and transmit the location to a technician in the field for troubleshooting and correcting the problem of noise ingress.

The foregoing description of embodiments has been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. All embodiments need not necessarily achieve all objects or advantages identified above. Any and all permutations of various features described herein are within the scope of the invention. For example, all steps in the processes of FIGS. 8A and 8B may not be performed, and the steps may be performed in a different order than how is illustrated and described.

The invention claimed is:

1. A method comprising:
   detecting changes in post-equalization filter coefficients of each of a plurality of devices connected to a network;
   determining, for each of the plurality of devices, multiple possible attenuation levels of noise transmitted to that device from respective multiple possible ingress locations in the network; and
   identifying one of the multiple possible ingress locations as a location where ingress of the noise occurred based on the changes in the post-equalization filter coefficients of each of the plurality of devices and the multiple possible attenuation levels of the noise.

2. The method of claim 1, further comprising:
   detecting changes in network characterization data received from each of the plurality of devices, wherein the identifying of the one of the multiple possible ingress locations as the location where ingress of the noise occurred is based on the changes in the network characterization data, and wherein the network characterization data includes frequency spectrum data of signals received by each of the plurality of devices.

3. The method of claim 1, wherein the multiple possible ingress locations include a range of locations along the network.

4. The method of claim 1, wherein the multiple possible ingress locations include geospatial locations of physical network components.

5. The method of claim 4, further comprising:
   displaying the location where ingress of the noise occurred on a map that illustrates the geospatial locations of the physical network components.

6. The method of claim 1, further comprising:
   receiving multiple iterations of the post-equalization filter coefficients from each of the plurality of devices over respective multiple iterations of time;
   detecting, for each of the plurality of devices, a difference between two of the iterations of the post-equalization filter coefficients; and
   comparing, for each of the plurality of devices, the difference between the two iterations to a predetermined threshold, wherein the detecting of the changes in the post-equalization filter coefficients received from each of the plurality of devices is based on the difference between the two iterations exceeding the predetermined threshold.

7. The method of claim 1, further comprising:
   identifying interconnection of network components in the network;

identifying signal paths from the multiple possible ingress locations to each of the plurality of devices based on the identified interconnection;

retrieving signaling characteristics of one or more of the network components; and associating the retrieved signaling characteristics of the one or more network components to the identified signal paths, wherein the determining of the multiple possible attenuation levels of the noise for each of the plurality of devices is based on the associating.

8. The method of claim 1, further comprising selecting the plurality of devices from among other devices connected to the network.

9. A method comprising:

receiving multiple iterations of network characterization data over respective multiple iterations of time from each of a plurality of devices connected to a network;

detecting a level of noise received at each of the plurality of devices based on a difference between two of the multiple iterations of the network characterization data;

determining attenuation levels of the noise at each of the plurality of devices for multiple possible locations of noise ingress in the network; and identifying a location of ingress of the noise into the network from among the multiple possible locations based on the level of noise received at each of the plurality of devices and the attenuation levels of the noise at each of the plurality of devices.

10. The method of claim 9, wherein the multiple possible locations include a range of locations along the network.

11. The method of claim 9, wherein the multiple possible locations include geospatial locations of physical network components.

12. The method of claim 11, further comprising:

displaying the location of the ingress of the noise into the network on a map that illustrates the geospatial locations of the physical network components.

13. The method of claim 9, further comprising:

identifying interconnection of network components in the network;

identifying signal paths from the multiple possible locations to each of the plurality of devices based on the identified interconnection;

retrieving signaling characteristics of one or more of the network components; and associating the retrieved signaling characteristics of the one or more network components to the identified signal paths, wherein the determining of the attenuation levels of the noise at each of the plurality of devices for the multiple possible locations of noise ingress in the network is based on the associating.

14. The method of claim 9, wherein the network characterization data includes frequency spectrum data of signals received by each of the plurality of devices.

15. The method of claim 9, further comprising selecting the plurality of devices from among other devices connected to the network.

16. A method comprising:

receiving multiple iterations of network characterization data over respective multiple iterations of time from each of a plurality of devices connected to a network;

detecting, for each of the plurality of devices, a difference between two of the iterations of the network characterization data; and identifying a location of ingress of noise into the network based on the detected difference for each of the plurality of devices and based on locations of the plurality of devices in the network, wherein the network characterization data includes post-equalization filter coefficients for each of the plurality of devices.

17. One or more memory devices storing machine-readable instructions that when executed by one or more processors cause an apparatus to:

receive multiple iterations of network characterization data over respective multiple iterations of time from each of a plurality of devices connected to a network;

detect a level of noise received at each of the plurality of devices based on a difference between two of the multiple iterations of the network characterization data;

determine attenuation factors associated with signal paths from multiple possible locations of noise ingress in the network to each of the plurality of devices; and identify one of the multiple possible locations as a location where the noise ingress occurred based on the detected level of noise received at each of the plurality of devices and the attenuation factors.

18. The one or more memory devices of claim 17, wherein the machine-readable instructions, when executed by one or more processors, further cause the apparatus to select the plurality of devices from among other devices connected to the network.

19. One or more memory devices storing machine-readable instructions that when executed by one or more processors cause an apparatus to:

receive multiple iterations of network characterization data over respective multiple iterations of time from each of a plurality of devices connected to a network;

detect, for each of the plurality of devices, a difference between two of the iterations of the network characterization data; and identify a location of ingress of noise into the network based on the difference between the two iterations for each of the plurality of devices and based on locations of the plurality of devices in the network, wherein the network characterization data includes post-equalization filter coefficients for each of the plurality of devices.

\* \* \* \* \*

UNITED STATES PATENT AND TRADEMARK OFFICE
CERTIFICATE OF CORRECTION

| | | Page 1 of 1 |
|---|---|---|
| PATENT NO. | : 9,015,786 B2 | |
| APPLICATION NO. | : 13/692499 | |
| DATED | : April 21, 2015 | |
| INVENTOR(S) | : Wolcott et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 149 days.

Signed and Sealed this
Twentieth Day of October, 2015

Michelle K. Lee
*Director of the United States Patent and Trademark Office*